United States Patent
Robins et al.

(10) Patent No.: US 7,271,830 B2
(45) Date of Patent: Sep. 18, 2007

(54) MOTION DETECTION IN AN IMAGE CAPTURING DEVICE

(75) Inventors: Mark N. Robins, Greeley, CO (US); Heather N. Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1077 days.

(21) Appl. No.: 10/073,623

(22) Filed: Feb. 11, 2002

(65) Prior Publication Data

US 2003/0151672 A1 Aug. 14, 2003

(51) Int. Cl.
*H04N 5/228* (2006.01)
*H04N 5/76* (2006.01)

(52) U.S. Cl. .............................. 348/208.6; 348/231.99

(58) Field of Classification Search .......... 348/208.99, 348/208.6, 208.4, 208.12, 208.13, 208.14
See application file for complete search history.

(56) References Cited

U.S. PATENT DOCUMENTS

| | | | |
|---|---|---|---|
| 3,690,234 A | 9/1972 | Costianes | 95/11 |
| 4,492,452 A | 1/1985 | Suzuki et al. | 354/430 |
| 4,949,117 A * | 8/1990 | Van Heyningen et al. | 396/100 |
| 5,030,984 A | 7/1991 | Buckler et al. | 354/430 |
| 5,103,254 A * | 4/1992 | Bell et al. | 396/147 |
| 5,583,791 A * | 12/1996 | Harigaya et al. | 348/575 |
| 5,619,258 A * | 4/1997 | Gillespie | 348/208.6 |
| 6,125,145 A * | 9/2000 | Koyanagi et al. | 375/240.16 |
| 6,803,945 B1 * | 10/2004 | Needham | 348/207.1 |

* cited by examiner

*Primary Examiner*—David Ometz
*Assistant Examiner*—Luong T. Nguyen

(57) ABSTRACT

An image capturing device includes an electronic image sensor, a memory, and a processor. The memory includes a motion detect routine, a predetermined image interval, and at least one predetermined motion threshold. The processor conducts the capturing of images separated by the predetermined image interval, compares a current image to one or more previous images, determines when motion between the current image and the previous image is below the at least one predetermined motion threshold, and stores the current image as a final image when the current image is stable.

27 Claims, 3 Drawing Sheets

MOTION DETECTION IN AN IMAGE CAPTURING DEVICE

FIELD OF THE INVENTION

The present invention relates generally to an image capturing device, and more particularly to an image capturing device that detects motion in images.

BACKGROUND OF THE INVENTION

Image capturing devices, such as cameras, are typically used to capture scenes, persons, settings, occasions, etc. Image capturing devices may be used to capture images of persons, or groups of persons, animals and wildlife, etc.

A typical problem encountered in photographing moving subjects, especially children, is capturing an image when no one is moving. The movement of a subject may result in blurring, improper focus, or the appearance of not everyone being ready for a photograph. An additional problem is when the photograph is being taken through the use of a timer, wherein there is no photographer urging the subjects to hold still, look at the camera, smile, etc.

In the prior art, the typical approach to the problem of motion in an image is that the photographer must monitor everyone to be included in an image. The photographer therefore must make sure no one is moving before pressing the shutter button. Consequently, the photographer must watch through the viewer and attempt to snap the photo when no movement is observed.

This prior art approach relies on luck and the ability of the photographer to monitor and control the subjects. However, the photographer may be too busy to monitor the movement of the subjects. In addition, there may be a time lag between checking for movement and pressing the shutter button, and the photographer may still capture some movement in the photo. Additionally, if motion of the subjects stop, it may be brief, and the photographer may miss it. If the photographer is using a timer, the photographer may not have control over when the shutter is actually activated and a good photo is still dependent on luck.

In another prior art approach, the prior art has approached the problem of motion through the use of high speed shuttering. However, this prior art approach limits the light, and may result in an underexposed picture.

Therefore, there remains a need in the art for improvements in image capturing devices.

SUMMARY OF THE INVENTION

An image capturing device comprises an electronic image sensor, a memory, and a processor. The memory includes a motion detect routine, a predetermined image interval, and at least one predetermined motion threshold. The processor conducts the capturing of images separated by the predetermined image interval, compares a current image to one or more previous images, determines when motion between the current image and the previous image is below the at least one predetermined motion threshold, and stores the current image as a final image when the current image is stable.

DETAILED DESCRIPTION

Figure 1:
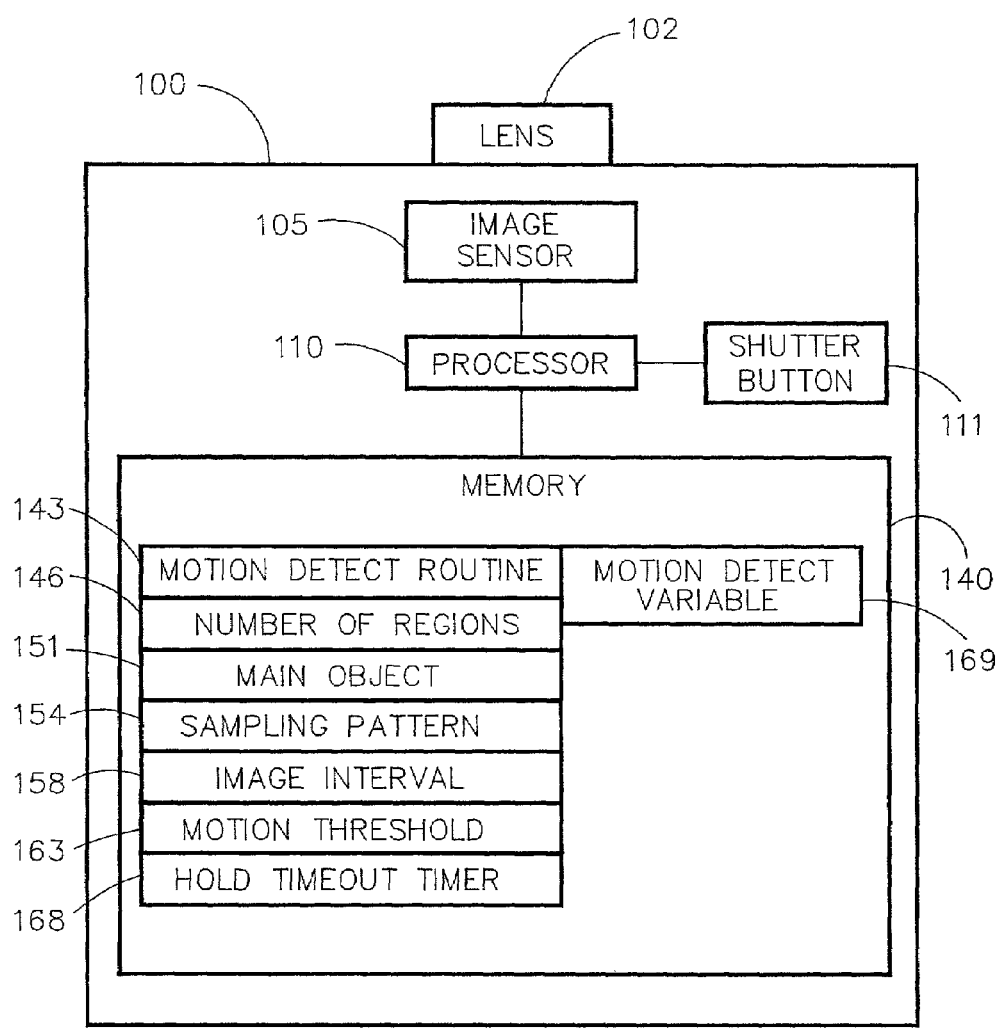
FIG. 1 is a schematic of an image capturing device according to one embodiment of the invention.

FIG. 1 is a schematic of an image capturing device 100 according to one embodiment of the invention. The image capturing device 100 may include a lens apparatus 102, an image sensor 105, a processor 110, a shutter button 111, and a memory 140.

In one embodiment, the image capturing device 100 may be a digital camera. In another embodiment, the image capturing device 100 may be a digital video camera capable of capturing still images.

The image sensor 105 may be any type of electronic image sensor capable of capturing images, such as a charge coupled device (CCD) sensor or a complementary metal oxide semiconductor (CMOS) sensor, for example.

The processor 110 may be any type of general purpose processor. The processor 110 executes a control routine contained in the memory 140. In addition, the processor 110 receives inputs and conducts image capturing operations.

The memory 140 may be any type of digital memory. The memory 140 may store, among other things, a motion detect routine 143, a number of (image sensor) regions variable 146, a main object designation 151, a sampling pattern 154, an image interval 158, one or more motion thresholds 163, a motion detect variable 169, and a hold timeout timer 168. In addition, the memory 140 may store captured images and software or firmware to be executed by the processor 110.

The motion detect routine 143 compares captured images and detects motion by detecting changes between pixels in the captured images. The motion detect routine 143 may compare all pixels in the images, may compare pixels of image regions, or may sample representative pixels. The motion detect routine 143 may compare pixel values between successive image frames and may produce a difference value for each compared pixel. In the absence of motion in the images, the pixels should change very little. Therefore, the difference values generated by the motion detect routine 143 may be compared to a threshold or thresholds in order to detect motion in the images.

The number of regions variable 146 is an optional variable and is included when an image is divided into regions. Each region may be concurrently processed in order to detect motion. If an unacceptable level of motion exists in any region, the image capturing operation may be delayed until the motion ceases (or at least drops to an acceptable level). It should be noted that individual regions may optionally include their own motion thresholds.

The main object designation 151 may be an optional feature where instead of comparing the whole image, the image capturing device 100 compares a designated object or region between image frames. The object or region may be, for example, a region in the center of the image, i.e., if the center of the image does not change then an image is captured. Alternatively, the designated object may be a designated person. The user of the image capturing device 100 may use crosshairs, etc., to designate a certain region or object. The region may encompass a person, a group of persons, or a designated set of regions.

The sampling pattern 154 may designate predetermined pixels to be sampled for the motion detection process. The sampling pattern 154 may be used for an entire image comparison, a designated object comparison, a regions comparison, etc. By using the sampling pattern 154, the image capturing device 100 may sample only designated pixels.

This reduces processing time and processing requirements while still providing a reliable motion determination.

The image interval 158 is a predetermined time interval between images, i.e., successive images are separated by the predetermined time interval. If motion is detected, the image capturing device 100 waits for the image interval 158 to expire and then captures another image to compare to the previous image.

The image interval 158 is optionally user-settable. The image interval 158 may be chosen to accommodate the particular image capture environment. If the image interval 158 is small, then the motion detection is of a finer resolution, but more processing will be required.

The one or more motion thresholds 163 are predetermined acceptable motion values. If the detected amount of pixel change is greater than a corresponding motion threshold 163, the image capturing device 100 determines that there is still an undesirable level of motion occurring in the most recently captured image. Conversely, if the detected amount of pixel change is less than or equal to the motion threshold 163, then the image capturing device 100 may determine that the level of motion is acceptable and may complete the image capturing operation.

It should be understood that one or more motion thresholds 163 may be used in an image capturing device embodiment that compares multiple image regions. In one embodiment a single threshold may cover all regions. In another embodiment, each region may include a corresponding threshold. In yet another embodiment, some regions may have individual thresholds and some regions may share a common threshold.

The hold timeout timer 168 may be loaded with a predetermined hold timeout period (i.e., a maximum hold time). Although the image capture and image comparison may be indefinitely repeated, the hold timeout timer 168 may function as an overall timer. Therefore, the hold timeout timer 168 may cause an image capture at some fixed point in time regardless of motion, i.e., at some point in time the image capturing device 100 gives up and captures an image, regardless of detected motion. The hold timeout timer 168 may be user-settable.

The motion detect variable 169 controls the motion detect mode. When the motion detect variable 169 is set to an enable state, the image capturing device 100 is in the motion detect mode. This variable may be user controlled, wherein the motion detect may be turned on and off.

In operation, the image capturing device 100 captures a current image and compares it to one or more previously captured images. If significant motion is detected, the process loops and repeats; otherwise the current image (i.e., the most recently captured image) is stored as the final image (see FIGS. 2 and 3 below and accompanying discussion).

Figure 2:
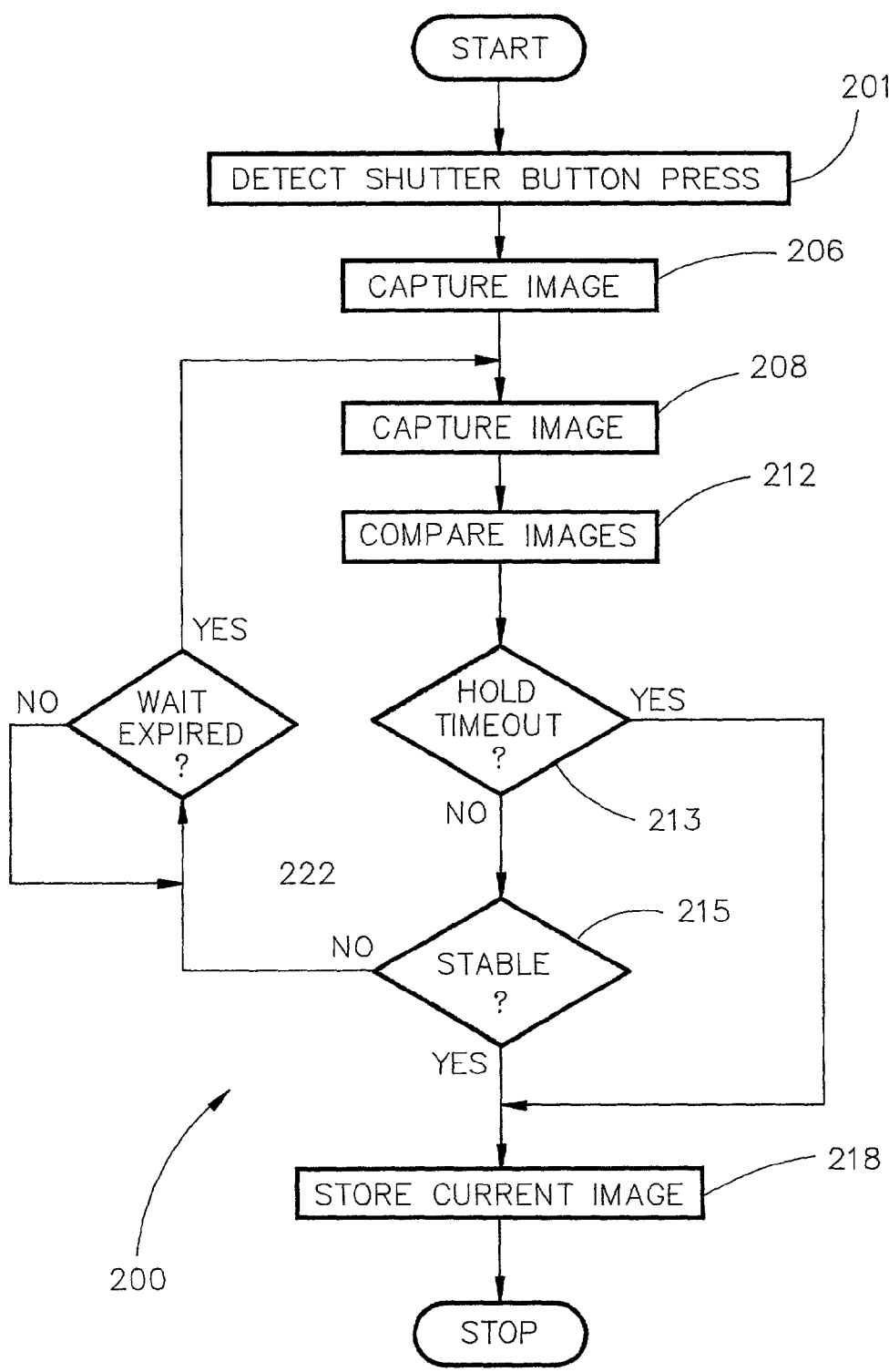
FIG. 2 is a flowchart of an image capturing method according to another embodiment of the invention.

FIG. 2 is a flowchart 200 of an image capturing method according to another embodiment of the invention. In step 201, a shutter button press is detected. The shutter button press signals the start of the image capturing process.

In step 206, an initial image is captured.

In step 208, another (current) image is captured.

In step 212, the current image is compared to one or more previously captured images. For example, the comparison may be between the current image and the previous image. Alternatively, the current image may be compared to more than one previous image. The comparison may be a comparison of entire images, may be a comparison of a designated object, may be a comparison of a designated region, or may be a region-by-region comparison.

In step 213, the hold timeout timer 168 is checked. The hold timeout timer 168 may ensure that the wait for a motionless image does not go on indefinitely, and limits the amount of time the image capturing device 100 will wait for motion to cease. If the hold timeout timer 168 has expired, the method branches to step 218; otherwise it proceeds to step 215.

In step 215, the method determines whether the current image is stable. This is done by comparing pixels (or sampled pixels) and comparing the amount of pixel change to one or more motion thresholds 163. The current image is stable if the amount of pixel change from the previous image is below the motion threshold 163 (i.e., the image does not include an unacceptable amount of motion). If the current image is not stable, the method branches to step 222. If the image is stable, the method proceeds to step 218.

In step 218, the current image is stored as the final image of the image capturing operation, as a result of the shutter button press. If the hold timeout timer 168 did not expire, the stored image will include motion that is less than the one or more motion thresholds 163. If the hold timeout timer 168 did expire, the stored image contains motion in excess of a motion threshold. The motion detection of this embodiment may optionally be enabled or disabled by the user.

In step 222, the method waits for the image interval 158 to expire and then another image is captured for a purpose of comparison. The image interval 158 therefore regulates the elapsed time between successive image captures.

Figure 3:
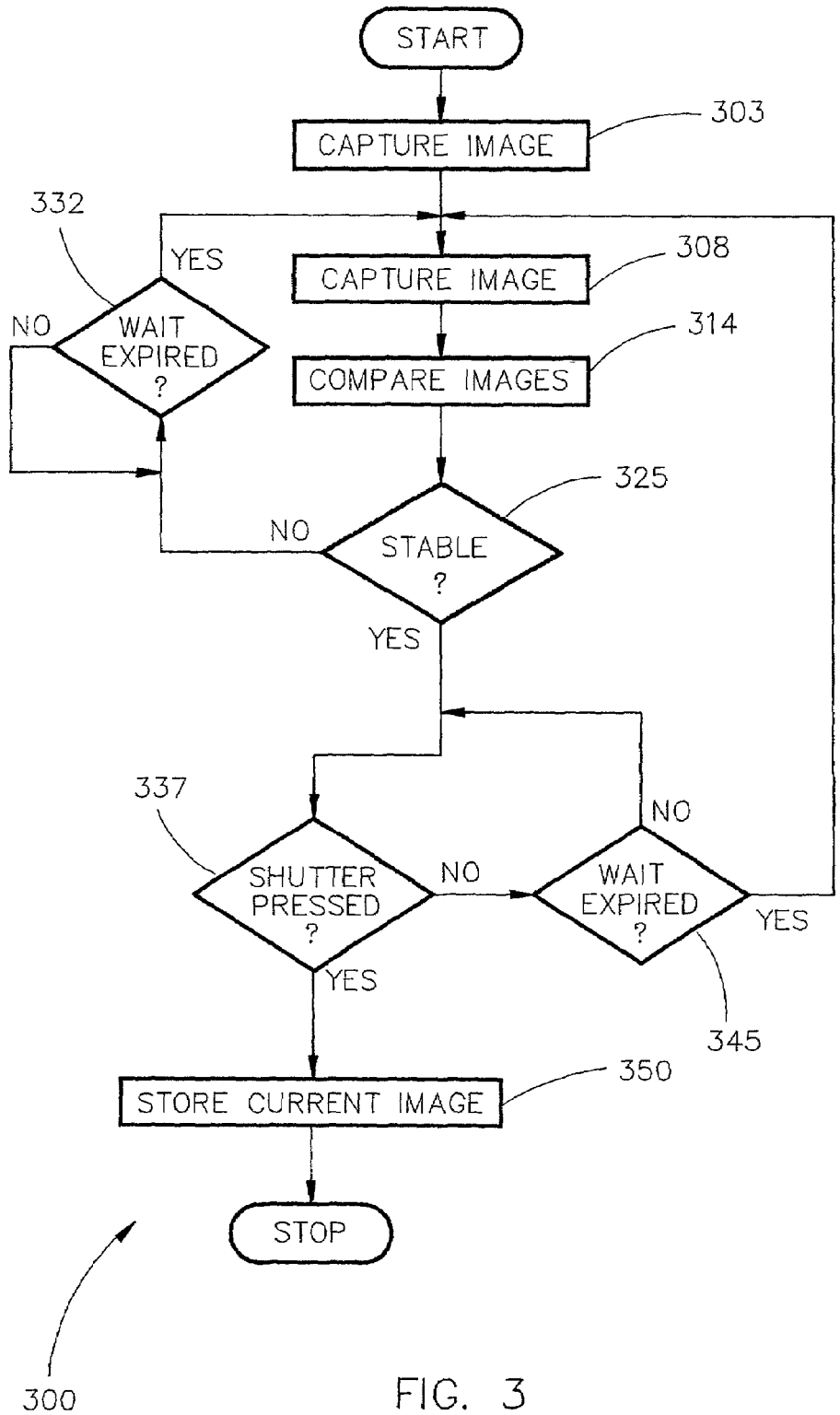
FIG. 3 is a flowchart of an image capturing method according to yet another embodiment of the invention.

FIG. 3 is a flowchart 300 of an image capturing method according to yet another embodiment of the invention. In step 303, an image is captured, as previously described.

In step 308, another (current) image is captured, as previously described.

In step 314, the current image is compared to one or more previously captured images, as previously described. For example, the comparison may be between the current image and the previous image. As before, the comparison may be a comparison of entire images, may be a comparison of a designated object, may be a comparison of a designated region, or may be a region-by-region comparison.

In step 325, it is determined whether the current image is stable. This is done by comparing pixels or sample pixels and comparing the amount of change between pixels to one or more motion thresholds 163, as previously discussed. If the current image is stable, the method proceeds to step 337; otherwise it branches to step 332.

In step 332, the image interval 158 is allowed to expire and another image is captured and a new comparison is performed. The image interval 158 therefore regulates the elapsed time between successive image captures.

In step 337, the image is stable and the method waits for a shutter button press. If the shutter button 111 is pressed, then the method proceeds to step 350. If the shutter button 111 is not pressed immediately after stability is achieved, the method proceeds to step 345.

In step 345, the hold timeout timer 168 (a hold time that waits for a shutter button press) is checked. If the hold timeout timer 168 has not expired, the method loops back to step 337. If the shutter button is not pressed before the hold timeout timer 168 expires, the method branches back to step 308, wherein a new current image is captured and the motion detect is reprocessed. This is done so that a significant amount of time does not elapse between the capturing of a stable image and a shutter button press.

In step 350, the most recently captured current image is saved as the final image of the image capturing operation.

This method may continuously monitor for image motion and may be ready for a shutter button press in advance. The flowchart 300 therefore shows a motion detect mode wherein images are periodically captured and processed in order to detect motion. If an acceptable level of motion or no motion is detected, the image capturing device 100 is ready for a shutter button press. However, if a shutter button press does not occur within the predetermined hold time, a new image is captured and processed to detect motion. As before, the motion detection of this embodiment may optionally be enabled or disabled by the user.

In addition, the image capturing method 300 may be in operation whenever the image capturing device 100 is placed in an image capturing mode, such as if a lens door is opened, for example. Alternatively, the image capturing method 300 may be in operation whenever the user at least partially depresses the shutter button 111 (such as to charge a flash or to determine a focus distance, for example). In addition, the image capturing method 300 may also be in operation during a preview mode, wherein images are continuously updated and shown on a display of the image capturing device 100 and the user can elect to press the shutter button 111 at any moment.

The motion detection according to the invention may be employed by any manner of digital still camera. In addition, the motion detection may be employed by any manner of video camera capable of capturing still images.

The invention differs from the prior art in that the prior art focuses on detecting motion in order to adjust shutter speed to accommodate motion. The prior art does not capture successive images and does not compare them and capture an image when motion in the images drops below a threshold.

In contrast, the image capture according to the invention is automatically performed once the motion falls below the threshold. Furthermore, the invention may continuously capture images, perform comparisons, and be ready for an image capture in advance of a shutter button press.

The invention provides several benefits. The photographer does not have to try to capture an image when no one is moving. Another benefit is that the photographer does not have to watch the subject closely and may focus on framing the image, lighting, arrangement, etc. Yet another benefit is that the motion detect according to the invention may render a timer unnecessary, as the photographer can place the camera in a motion detect mode and join the group. As a result, the image capture occurs when the photographer is in front of the camera and no motion exists.

We claim:

1. An image capturing device, comprising:
an electronic image sensor;
a memory including a motion detect routine, a predetermined image interval, and at least one predetermined motion threshold; and
a processor communicating with said electronic image sensor, a shutter button, and said memory, said processor being configured to: (a) compare a second image to a first image, wherein the second image is captured after the first image is captured, to determine if motion between said second image and said first image is below said at least one predetermined motion threshold, (b) store said second image as a final image if the motion between said second image and said first image is below said at least one predetermined motion threshold, and (c) capture a third image and compare the third image with the second image to determine if motion between said third image and said second image is below said at least one predetermined motion threshold if the motion between said second image and said first image is not below said predetermined motion threshold.

2. The image capturing device of claim 1, said memory further including a predetermined sampling pattern of pixels to be sampled in a captured image and wherein a comparison is performed on pixels included in said predetermined sampling pattern.

3. The image capturing device of claim 1, wherein the processor is configured to compare a main object of the second image with a main object of the first image to determine if motion between said second image and said first image is below said at least one predetermined motion threshold.

4. The image capturing device of claim 1, said memory further including a number of regions data dividing a captured image into a plurality of image regions and wherein a region-by-region comparison is performed between two successive images.

5. The image capturing device of claim 1, said memory further including a motion detect variable, wherein a motion detection is performed when said motion detect variable is set to an enable state.

6. The image capturing device of claim 1, wherein said predetermined motion threshold is user-settable.

7. The image capturing device of claim 1, wherein said processor is further configured to set a hold out timer to expire in a predetermined amount of time in response to detecting a shutter button press.

8. The image capturing device of claim 1, wherein said processor is further configured to store said second image as a final image in response to the expiration of said hold out timer.

9. The image capturing device of claim 1, said memory further including a hold timeout timer tat stores a predetermined hold timeout period and wherein said current image is stored as a final image if said hold timeout timer expires.

10. An image capturing method, comprising: detecting a shutter button press; and
in response to detecting the shutter button press, performing an image capturing operation, wherein the image capturing operation produces a final image and comprises the acts of:
(a) capturing a previous image;
(b) capturing a current image;
(c) determining if said current image is stable with regard to motion;
(d) if it is determined that said current image is stable with regard to motion. then storing the current image as the final image of the image capturing operation; and
(e) if it is determined that said current image is not stable with regard to motion, then repeating steps (b) through (e).

11. The method of claim 10, further comprising
setting a hold out timer to expire in a predetermined amount of time in response to detecting the shutter button press.

12. The method of claim 11, further comprising the step of storing said current image as the final image upon expiration of said hold timeout timer.

13. The method of claim 10, further comprising the step of waiting a predetermined un age interval between image captures.

14. The method of claim 10, wherein the step of comparing compares all pixels in said current image and in said previous image.

15. The method of claim 10, wherein the step of comparing compares a predetermined sampling pattern of pixels in said current image and in said previous image.

16. The method of claim 10, wherein the step of comparing compares a predetermined region in said current image and in said previous image.

17. The method of claim 10, wherein the step of comparing compares a user-designated region in said current image and in said previous image.

18. The method of claim 10, wherein the step of comparing compares a user-designated object in said current image and in said previous image.

19. The method of claim 10, wherein the step of comparing compares a plurality of regions in said current image to a corresponding plurality of regions in said previous image, and wherein said current image is determined to be stable when all regions in said plurality of regions are determined to be stable.

20. An image capturing method, comprising the steps of:
    detecting a shutter button press; and
    in response to detecting the shutter button press, performing an image capturing operation, wherein the image capturing operation produces a final image and comprises the acts of:
        setting a hold out timer to expire in a predetermined amount of time;
        capturing a first image;
        capturing a second image after capturing the first image;
        comparing the second image to the first image;
        determining whether the hold out timer has expired:
        if it is determined that the hold out timer has expired, then storing the second image as the final image of the image capturing operation;
        determining if the second image is stable with regard to motion;
        if the second image is stable with regard to motion, then storing the second image as the final image, and
        if the second image is not stable with regard to motion, then (i) capturing a third image and (ii) comparing the third image to the second image.

21. The method of claim 20, further comprising the step of waiting a predetermined time interval between image captures.

22. The method of claim 20, wherein the step of comparing compares all pixels in said second image and in said first image.

23. The method of claim 20, wherein the step of comparing compares a predetermined sampling pattern of pixels in said second image and in said first image.

24. The method of claim 20, wherein the step of comparing compares a predetermined region in said second image and in said first image.

25. The method of claim 20, wherein the step of comparing compares a user-designated region in said second image and in said first image.

26. The method of claim 21, wherein the step of comparing compares a user-designated object in said second image and in said first image.

27. The method of claim 21, wherein the step of comparing compares a plurality of regions in said second image to a corresponding plurality of regions in said first image, and wherein said second image is determined to be stable when all regions in said plurality of regions are determined to be stable.

* * * * *

UNITED STATES PATENT AND TRADEMARK OFFICE
CERTIFICATE OF CORRECTION

| | | |
|---|---|---|
| PATENT NO. | : 7,271,830 B2 | Page 1 of 1 |
| APPLICATION NO. | : 10/073623 | |
| DATED | : September 18, 2007 | |
| INVENTOR(S) | : Mark N. Robins et al. | |

It is certified that error appears in the above-identified patent and that said Letters Patent is hereby corrected as shown below:

In column 6, line 36, in Claim 9, delete "tat" and insert -- that --, therefor.

In column 6, line 50, in Claim 10, after "motion" delete "." and insert -- , --, therefor.

In column 6, line 63, in Claim 13, delete "un age" and insert -- image --, therefor.

In column 7, line 30, in Claim 20, after "expired" delete ":" and insert -- ; --, therefor.

Signed and Sealed this

Seventeenth Day of June, 2008

JON W. DUDAS
*Director of the United States Patent and Trademark Office*